Patented Dec. 7, 1948

2,455,697

UNITED STATES PATENT OFFICE 2,455,697

VULCANIZATION OF NEOPRENE

Paul F. Niessen, Canal Fulton, Ohio, assignor to The B. F. Goodrich Company, New York, N. Y., a corporation of New York No Drawing. Application October 13, 1944, Serial No. 558,605

1 Claim. (Cl. 260—92.7)

This invention relates to the vulcanization of neoprene and has as its object to provide a method for vulcanizing neoprene so as to produce products of superior quality.

Neoprene is well known to be the rubbery polymer of chloroprene or of mixtures consisting predominately of chloroprene. Neoprene differs from natural rubber in that it does not undergo vulcanization when heated with sulfur or sulfur compounds, but requires other agents or combinations for bringing about its vulcanization. However, it resembles rubber more closely than do the other so-called synthetic rubbers now known in that it is capable of undergoing crystallization either upon standing at a low temperature or upon stretching beyond a critical elongation.

The very resemblance of neoprene to natural rubber is a source of difficulty in that products made of neoprene often tend to stiffen because of undesired crystallization upon storage or use at moderately low temperatures. This invention provides a means for avoiding this difficulty and producing neoprene products which are relatively free from tendency to stiffen or to crystallize at low temperatures.

In accordance with this invention, neoprene is mixed with a liquid diarylamine in addition to the usual vulcanizing agents and is then fabricated and vulcanized in the usual manner. The products exhibit a remarkable difference from those similarly prepared, omitting the liquid dairylamine or prepared with dairylamines which are not liquid.

This invention is of special value in the manufacture of thin products such as those made by dipping or the like directly from neoprene latex. Such products, including inflatable balloons, surgeons' gloves, prophylactic goods and the like need be extremely flexible and extensible if they are best to serve their purpose. When manufactured by procedures heretofore known an objectionable tendency toward stiffness has frequently been encountered, but when prepared by the method of this invention, this difficulty is removed.

As a specific example of one embodiment of the invention, neoprene latex containing 100 parts by weight of neoprene on a dry basis is mixed with aqueous dispersions containing 4 parts of magnesium oxide, 5 parts of zinc oxide and 2 parts of liquid heptylated diphenylamine. The liquid heptylated diphenylamine is prepared by heating diphenylamine with a mixture of heptenes in the presence of an acidic condensation catalyst until about half of the diphenylamine has undergone reaction and removing the catalyst and the unreacted diphenylamine. The liquid residue of this reaction is a diarylamine containing an average of about one heptyl radical substituted on the aromatic nucleus of each diphenylamine molecule.

A dipped product is made by immersing a suitably shaped form first in a latex coagulant and then in the neoprene latex composition. After a short time a coherent film of coagulated neoprene is deposited on the surface of the form, the thickness depending upon the time of immersion. The form is withdrawn, washed in fresh water, dried, and the neoprene film on the surface of the form is vulcanized by heating it on the form in an oven at a temperature of 220 to 240° F. for one hour.

The product prepared as described above is found to be well vulcanized, soft, flexible and easily extensible, having to a high degree the desirable snap characteristic of well-vulcanized soft rubber. A neoprene product similarly prepared but without the liquid heptylated diphenylamine was stiff and harsh in feel and resisted elongation until warmed to a temperature somewhat above ordinary room temperature.

Similar results can be secured using other liquid diarylamines, such as liquid diphenylamine acetone reaction product, liquid diphenylamine formaldehyde reaction product and especially the simple liquid alkylated diphenylamines including in addition to the heptylated diphenylamine described above, the similar butylated, hexylated and octylated diphenylamines.

I claim:

The method of manufacturing a thin flexible and extensible rubber product, characterized by possessing superior resistance to crystallization on aging, from a latex of a plastic polymer of a monomeric material consisting entirely of 2-chloro butadiene-1,3, which comprises adding to said latex compounding ingredients including substantially 4% by weight based on the polymer in the latex of magnesium oxide, substantially 5% by weight based on the polymer in the latex of zinc oxide, and substantially 2% by weight based on the polymer in the latex of liquid heptylated diphenylamine, forming a product from the resulting compounded latex, drying the product and heating the product at a temperature of substantially 220 to 240° F. for substantially one hour.

PAUL F. NIESSEN.

(References on following page)

REFERENCES CITED

The following references are of record in the file of this patent:

UNITED STATES PATENTS

| Number | Name | Date |
|---|---|---|
| 1,967,861 | Collins | July 24, 1934 |
| 2,419,736 | Slaon | Apr. 29, 1947 |

OTHER REFERENCES

Neoprene Compounding Principles, Report N-5 (DuPont Co. Pub.) August 1937.

Neoprene Latex Type 57, Report No. 39-3 (DuPont Co. Pub.) August 1937.

Neoprene Latex Type 571, Report No. 43-2 (DuPont Co. Pub.) August 1937.